US012665112B2

(12) United States Patent
Takeda et al.

(10) Patent No.: US 12,665,112 B2
(45) Date of Patent: *Jun. 23, 2026

(54) GRAIN-ORIENTED ELECTRICAL STEEL SHEET AND METHOD FOR FORMING INSULATING COATING

(71) Applicant: NIPPON STEEL CORPORATION, Tokyo (JP)

(72) Inventors: Kazutoshi Takeda, Tokyo (JP); Takashi Kataoka, Tokyo (JP); Shinsuke Takatani, Tokyo (JP); Yuuki Kogakura, Tokyo (JP); Yuki Kunita, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 191 days.

This patent is subject to a terminal disclaimer.

(21) Appl. No.: 18/285,481

(22) PCT Filed: Apr. 6, 2022

(86) PCT No.: PCT/JP2022/017197

§ 371 (c)(1),
(2) Date: Oct. 3, 2023

(87) PCT Pub. No.: WO2022/215710

PCT Pub. Date: Oct. 13, 2022

(65) Prior Publication Data

US 2024/0186039 A1 Jun. 6, 2024

(30) Foreign Application Priority Data

Apr. 6, 2021 (JP) ................................ 2021-064968

(51) Int. Cl.
*H01F 1/147* (2006.01)
*C21D 1/74* (2006.01)
(Continued)

(52) U.S. Cl.
CPC .......... *H01F 1/14783* (2013.01); *C21D 1/74* (2013.01); *C21D 6/005* (2013.01); *C21D 6/008* (2013.01);
(Continued)

(58) Field of Classification Search
CPC .. H01F 1/18; H01F 1/147; C21D 1/74; C21D 6/002; C21D 6/005; C21D 6/008;
(Continued)

(56) References Cited

U.S. PATENT DOCUMENTS 3,856,568 A 12/1974 Tanaka et al.
3,932,236 A 1/1976 Wada et al.
(Continued)

FOREIGN PATENT DOCUMENTS

CN 109983158 A 7/2019
EP 0 565 029 A1 10/1993
(Continued)

OTHER PUBLICATIONS

U.S. Office Action for U.S. Appl. No. 18/284,263, dated Sep. 17, 2025.
(Continued)

*Primary Examiner* — Megha M Gaitonde
(74) *Attorney, Agent, or Firm* — Birch, Stewart, Kolasch & Birch, LLP

(57) ABSTRACT

This grain-oriented electrical steel sheet includes: a base steel sheet; and an insulating coating formed on a surface of the base steel sheet, in which the insulating coating includes an intermediate layer formed on a base steel sheet side and containing a crystalline metal phosphate, and a tension coating layer formed on a surface side of the insulating coating, the surface of the base steel sheet has an etch pit structure, an average thickness of the intermediate layer is 0.2 to 10.0 μm, an average thickness of the insulating
(Continued)

coating is 2.0 to 10.0 μm, the tension coating layer contains a metal phosphate and silica, and an amount of the silica in the tension coating layer is 20 to 60 mass %.

4 Claims, 1 Drawing Sheet

(51) Int. Cl.

| | |
|---|---|
| ***C21D 6/00*** | (2006.01) |
| ***C21D 8/1216*** | (2026.01) |
| ***C21D 8/1244*** | (2026.01) |
| ***C21D 8/1277*** | (2026.01) |
| ***C21D 9/46*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C23C 24/10*** | (2006.01) |
| ***C23C 26/00*** | (2006.01) |
| ***C23C 28/04*** | (2006.01) |

(52) U.S. Cl.
CPC ......... *C21D 8/1222* (2013.01); *C21D 8/1255* (2013.01); *C21D 8/1261* (2013.01); *C21D 8/1272* (2013.01); *C21D 8/1283* (2013.01); *C21D 8/1288* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C23C 24/10* (2013.01); *C23C 26/00* (2013.01); *C23C 28/04* (2013.01); *C21D 2201/05* (2013.01); *C22C 2202/02* (2013.01)

(58) Field of Classification Search
CPC .. C21D 8/0284; C21D 8/1222; C21D 8/1244; C21D 8/1233; C21D 8/1255; C21D 8/1261; C21D 8/1266; C21D 8/1272; C21D 8/1283; C21D 8/1294; C21D 9/46; C21D 2201/05; C22C 38/001; C22C 38/002; C22C 38/004; C22C 38/008; C22C 38/02; C22C 38/04; C22C 38/06; C22C 38/12; C22C 38/14; C22C 38/20; C22C 38/22; C22C 38/24; C22C 38/26; C22C 38/28; C22C 38/32; C22C 38/34; C22C 38/40; C22C 38/60; C22C 38/82; C23C 28/04; C23C 22/00; C23C 22/12; C23C 22/18; C23C 22/20; C23C 22/22; C23C 22/33; C23C 22/42; C23C 22/43; C23C 22/74; B32B 15/04; B32B 15/18; B32B 15/20; C23G 1/08
USPC .......................................................... 428/220
See application file for complete search history.

(56) References Cited

U.S. PATENT DOCUMENTS

| | | | | |
|---|---|---|---|---|
| 6,322,688 | B1 | 11/2001 | Yamazaki et al. | |
| 6,461,741 | B1 * | 10/2002 | Takeda .................. | C04B 28/346 427/127 |
| 2009/0233114 | A1 * | 9/2009 | Takeda .................... | C23C 22/20 427/343 |
| 2019/0271087 | A1 | 9/2019 | Takeda et al. | |
| 2019/0390350 | A1 * | 12/2019 | Umada ................... | C22C 38/00 |
| 2022/0090227 | A1 * | 3/2022 | Ushigami ................ | C21D 9/46 |
| 2024/0158895 | A1 * | 5/2024 | Takeda .................. | C22C 38/008 |
| 2024/0183012 | A1 * | 6/2024 | Takeda ................. | C21D 8/1283 |
| 2024/0186039 | A1 | 6/2024 | Takeda et al. | |

FOREIGN PATENT DOCUMENTS

| | | | |
|---|---|---|---|
| JP | 48-39338 | A | 6/1973 |
| JP | 49-96920 | A | 9/1974 |
| JP | 5-279747 | A | 10/1993 |
| JP | 6-184762 | A | 7/1994 |
| JP | 11-209891 | A | 8/1999 |
| JP | 2005-139481 | A | 6/2005 |
| JP | 2007-217758 | A | 8/2007 |
| JP | 2018-62682 | A | 4/2018 |
| JP | 2020111814 | A * | 7/2020 |

OTHER PUBLICATIONS

U.S. Office Action for U.S. Appl. No. 18/285,451, dated Sep. 17, 2025.

* cited by examiner

GRAIN-ORIENTED ELECTRICAL STEEL SHEET AND METHOD FOR FORMING INSULATING COATING

TECHNICAL FIELD OF THE INVENTION

The present invention relates to a grain-oriented electrical steel sheet and a method for forming an insulating coating.

Priority is claimed on Japanese Patent Application No. 2021-064968, filed Apr. 6, 2021, the content of which is incorporated herein by reference.

RELATED ART

Grain-oriented electrical steel sheets are mainly used in transformers. A transformer is continuously excited over a long period of time from installation to disposal and continues to generate energy losses. Therefore, an energy loss during magnetization with an alternating current, that is, an iron loss, is a main index that determines performance of the transformer.

In order to reduce the iron loss of the grain-oriented electrical steel sheet, many techniques have been developed from the viewpoints of (a) increasing the development in a {110}<001> orientation (Goss orientation), (b) increasing an electric resistance of the steel sheet by increasing the amounts of solute elements such as Si, or (c) reducing a thickness of the electrical steel sheet.

In addition, applying tension to the steel sheet is effective in reducing the iron loss. Forming a coating of a material having a coefficient of thermal expansion smaller than that of a steel sheet on a surface of the steel sheet at a high temperature is an effective measure for reducing the iron loss. A forsterite-based coating (inorganic coating) which is generated by a reaction between an oxide on a surface of a steel sheet and an annealing separating agent in a secondary recrystallisation annealing step of the electrical steel sheet and has excellent coating adhesion is a coating that can apply tension to the steel sheet.

In addition, for example, a method disclosed in Patent Document 1 in which a coating liquid primarily containing colloidal silica and a phosphate is baked onto a surface of a steel sheet to form an insulating coating is highly effective in applying tension to the steel sheet and is thus an effective method for reducing the iron loss. Therefore, in a general manufacturing method of a grain-oriented electrical steel sheet, a forsterite-based coating generated in a secondary recrystallisation annealing step is left and an insulating coating primarily containing a phosphate is applied onto the forsterite-based coating.

However, in recent years, there has been an increasing demand for miniaturization and high performance of transformers, and for miniaturization of transformers, a grain-oriented electrical steel sheet having good iron loss even at a high magnetic flux density, that is, having excellent high magnetic field iron loss is required. At the same time, in recent years, it has become clear that a forsterite-based coating hinders the movement of a magnetic domain wall and adversely affects the iron loss. In the grain-oriented electrical steel sheet, a magnetic domain changes due to the movement of a magnetic domain wall under an AC magnetic field. The smooth and rapid movement of the magnetic domain wall is effective in reducing the iron loss. However, the forsterite-based coating itself is a non-magnetic material and has an uneven structure at an interface between a steel sheet and the coating, and this uneven structure hinders the movement of the magnetic domain wall. Therefore, it is considered that the forsterite-based coating has an adverse effect on the iron loss.

Therefore, as a measure for improving the high magnetic field iron loss, a method of removing an inorganic coating by a mechanical method such as polishing or a chemical method such as pickling, a technique for manufacturing a grain-oriented electrical steel sheet having no inorganic coating by preventing the generation of an inorganic coating in high-temperature secondary recrystallisation annealing, and a technique for bringing a surface of a steel sheet into a mirror surface state (in other words, a technique for magnetically smoothing a surface of a steel sheet) have been studied.

As a technique for preventing the generation of an inorganic coating, for example, Patent Document 2 discloses a technique in which pickling is performed after normal secondary recrystallisation annealing to remove surface formations, and a surface of a steel sheet is then brought into a mirror surface state by chemical polishing or electrolytic polishing. It has been found that, by forming a tension-applying insulating coating on a surface of a grain-oriented electrical steel sheet having no inorganic coating, which is obtained by such a known method, better iron loss improving effects can be obtained. In addition, according to the tension-applying insulating coating, various properties such as corrosion resistance, heat resistance, and a sliding property can be applied in addition to the improvement in iron loss.

However, the inorganic coating has an effect of exhibiting insulation properties and an effect as an intermediate layer for securing adhesion when forming a tension coating (tension-applying insulating coating). That is, since the inorganic coating is formed in a state of penetrating deep into the steel sheet, the adhesion to the steel sheet, which is a metal, is excellent. Therefore, in a case where a tension-applying coating (tension coating) primarily containing colloidal silica, a phosphate, or the like is formed on a surface of the inorganic coating, the coating adhesion is excellent. On the other hand, in general, bonding between a metal and an oxide is difficult. Therefore, it has been difficult to secure sufficient adhesion between the tension coating and the surface of the steel sheet in the absence of an inorganic coating.

Therefore, in the case of forming the tension coating on the grain-oriented electrical steel sheet having no inorganic coating, it has been studied to provide a layer that acts as an intermediate layer instead of the inorganic coating.

For example, Patent Document 3 discloses a technique in which a grain-oriented electrical steel sheet having no inorganic coating is annealed in a weakly reducing atmosphere, silicon that is unavoidably contained in the silicon steel sheet is selectively thermally oxidized to form a $SiO_2$ layer on a surface of the steel sheet, and thereafter a tension-applying insulating coating is formed. Patent Document 4 discloses a technique in which a grain-oriented electrical steel sheet having no inorganic coating is subjected to an anodic electrolytic treatment in a silicate aqueous solution to form a $SiO_2$ layer on a surface of the steel sheet, and thereafter a tension-applying insulating coating is formed.

Patent Document 5 discloses a technique in which a coating which is to become an intermediate layer is applied in advance when a tension-applying coating is formed, thereby securing the adhesion of a tension-applying insulating coating.

Patent Document 6 discloses a grain-oriented electrical steel sheet including a base steel sheet and a tension-applying insulating coating, in which the tension-applying insulating coating is present on a surface of the grain-oriented electrical steel sheet, and an iron-based oxide layer having a thickness of 100 to 500 nm is present between the base steel sheet and the tension-applying insulating coating.

In addition, it is also disclosed that in order to form a coating on a surface of a grain-oriented electrical steel sheet having no inorganic coating with good adhesion, the surface of the steel sheet is controlled. For example, Patent Document 7 discloses a grain-oriented electrical steel sheet including a tension-applying insulating coating provided on a surface of the grain-oriented electrical steel sheet, in which the surface of the grain-oriented electrical steel sheet on a side on which the tension-applying insulating coating is provided has a rectangular fine structure.

PRIOR ART DOCUMENT

Patent Document

[Patent Document 1] Japanese Unexamined Patent Application, First Publication No. S48-039338
[Patent Document 2] Japanese Unexamined Patent Application, First Publication No. S49-96920
[Patent Document 3] Japanese Unexamined Patent Application, First Publication No. H6-184762
[Patent Document 4] Japanese Unexamined Patent Application, First Publication No. H11-209891
[Patent Document 5] Japanese Unexamined Patent Application, First Publication No. H5-279747
[Patent Document 6] Japanese Unexamined Patent Application, First Publication No. 2020-111814
[Patent Document 7] Japanese Unexamined Patent Application, First Publication No. 2018-062682

DISCLOSURE OF THE INVENTION

Problems to be Solved by the Invention

However, in the technique disclosed in Patent Document 3, in order to perform the annealing in the weakly reducing atmosphere, an annealing facility capable of controlling the atmosphere needs to be prepared, so that there is a problem in a treatment cost. In the technique disclosed in Patent Document 4, in order to obtain the $SiO_2$ layer that has sufficient adhesion to the tension-applying insulating coating on the surface of the steel sheet by performing the anodic electrolytic treatment in the silicate aqueous solution, a new electrolytic treatment facility needs to be prepared, so that there is a problem in a treatment cost.

In the technique disclosed in Patent Document 5, there is a problem in that the tension-applying insulating coating having a large tension cannot be held with good adhesion.

In the technique disclosed in Patent Document 6, it is described that in order to form the iron-based oxide layer, the grain-oriented electrical steel sheet after a surface treatment is heated in an atmosphere having an oxygen concentration of 1 to 21 volume % and a dew point of −20° C. to 30° C. at a steel sheet temperature of 700° C. to 900° C. for 5 to 60 seconds. Therefore, in a case of manufacturing a steel sheet having an inorganic coating on the same line, it is necessary to change an atmosphere of an annealing furnace, resulting in inferior workability.

In addition, Patent Document 7 has a problem of uneven pickling.

Therefore, an object of the present invention is to provide a grain-oriented electrical steel sheet which has excellent coating adhesion, excellent coating tension, and excellent magnetic characteristics and in which an inorganic coating is not provided. Another object of the present invention is to provide a method for forming an insulating coating included in the grain-oriented electrical steel sheet.

Means for Solving the Problem

The present inventors have studied the above-mentioned problems. As a result, it was found that in a grain-oriented electrical steel sheet having no forsterite-based coating, by providing an etch pit structure on a surface of a base steel sheet and an intermediate layer formed of a crystalline metal phosphate between the base steel sheet and a tension coating, coating adhesion, coating tension, and magnetic characteristics can be enhanced.

The present invention has been made based on the above findings. The gist of the present invention is as follows.

[1] A grain-oriented electrical steel sheet according to an aspect of the present invention includes: a base steel sheet; and an insulating coating formed on a surface of the base steel sheet, in which the insulating coating includes an intermediate layer formed on a base steel sheet side and containing a crystalline metal phosphate, and a tension coating layer formed on a surface side of the insulating coating, the surface of the base steel sheet has an etch pit structure, an average thickness of the intermediate layer is 0.2 to 10.0 μm, an average thickness of the insulating coating is 2.0 to 10.0 μm, the tension coating layer contains a metal phosphate and silica, and an amount of the silica in the tension coating layer is 20 to 60 mass %.

[2] In the grain-oriented electrical steel sheet according to [1], the crystalline metal phosphate of the intermediate layer may be one or two or more of zinc phosphate, manganese phosphate, iron phosphate, and zinc calcium phosphate.

[3] A method for forming an insulating coating according to another aspect of the present invention is a method for forming the insulating coating included in the grain-oriented electrical steel sheet according to [1], the method including: a secondary recrystallisation annealing process of applying an annealing separating agent containing 10 to 100 mass % of $Al_2O_3$ to a steel sheet, drying the steel sheet, and performing secondary recrystallisation annealing on the steel sheet; an annealing separating agent removing process of removing an excess amount of the annealing separating agent from the steel sheet after the secondary recrystallisation annealing process; an acid treatment process of immersing the steel sheet after the annealing separating agent removing process in a mixed acid in which a concentration of one or two or more selected from sulfuric acid, phosphoric acid, and nitric acid is 0.5 to 20 wt % and a liquid temperature is 40° C. to 90° C. for 5 to 50 seconds; an immersion process of immersing the steel sheet after the acid treatment process in a treatment liquid containing 5 to 50 mass % of a metal phosphate at a liquid temperature of 40° C. to 85° C. for 5 to 150 seconds; a drying process of pulling up the steel sheet after the immersion process from the treatment liquid, removing an excess amount of the treatment liquid, and drying the steel sheet; and a tension coating layer forming process of applying a coating liquid containing a metal phosphate and colloidal silica so that an amount of the colloidal silica is 30 to 150 parts by mass with respect to 100 parts by mass of the metal phosphate to the steel sheet after the drying process, drying the steel sheet, and holding the steel sheet in a state in which a sheet temperature is 700° C. to 950° C. for 10 to 120 seconds.

[4] In the method for forming the insulating coating according to [3], the annealing separating agent may further contain one or two of MgO: 5 to 90 mass % and a chloride: 0.5 to 10.0 mass %.

Effects of the Invention

According to the above aspect of the present invention, it is possible to provide a grain-oriented electrical steel sheet which has excellent coating adhesion, excellent coating tension, and excellent magnetic characteristics and in which a forsterite-based coating is not provided. In addition, according to the above aspect of the present invention, it is possible to provide a method for forming an insulating coating included in a grain-oriented electrical steel sheet having excellent coating adhesion and excellent magnetic characteristics.

EMBODIMENTS OF THE INVENTION

A grain-oriented electrical steel sheet according to an embodiment of the present invention (a grain-oriented electrical steel sheet according to the present embodiment) and a manufacturing method of the grain-oriented electrical steel sheet according to the present embodiment including a method for forming an insulating coating included in the grain-oriented electrical steel sheet according to the present embodiment will be described.

First, the grain-oriented electrical steel sheet according to the present embodiment will be described.

Figure 1:
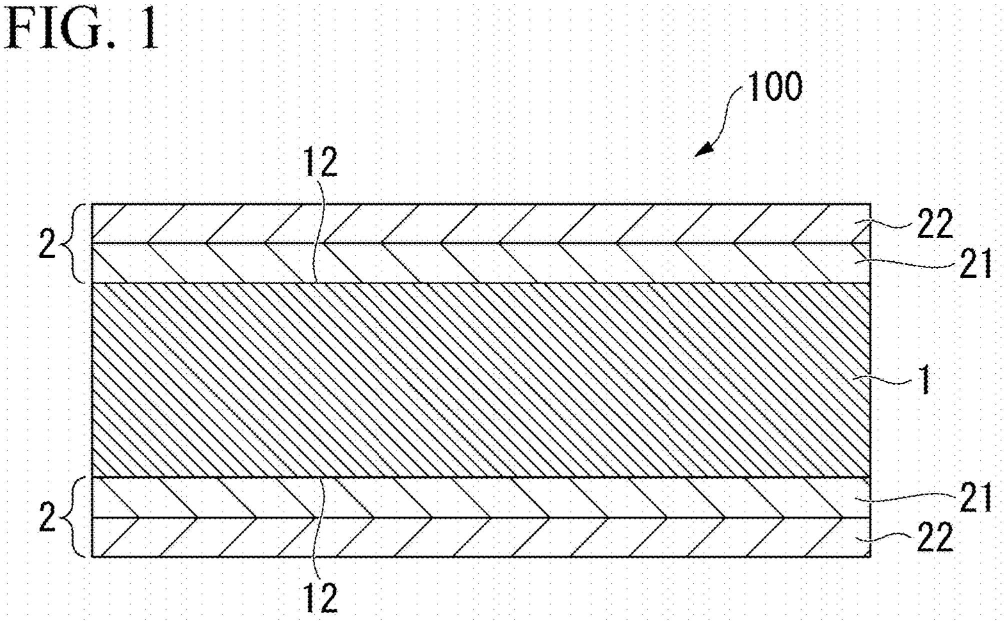
FIG. 1 is an example of a cross-sectional view of a grain-oriented electrical steel sheet according to the present embodiment.

As shown in FIG. 1, a grain-oriented electrical steel sheet 100 according to the present embodiment includes a base steel sheet 1 and an insulating coating 2 formed on a surface of the base steel sheet 1, and does not include a forsterite-based coating on the surface of the base steel sheet 1.

In addition, an etch pit structure 12 is formed on the surface of the base steel sheet 1, and the insulating coating 2 includes a tension coating layer 22 formed on a surface side of the insulating coating 2 (that is, on a surface side of the grain-oriented electrical steel sheet 100) and an intermediate layer 21 formed on a base steel sheet 1 side and containing a crystalline metal phosphate.

<Base Steel Sheet>

(Chemical Composition)

The grain-oriented electrical steel sheet 100 according to the present embodiment is significantly characterized in a structure of the insulating coating 2 formed on the surface of the base steel sheet 1. A chemical composition of the base steel sheet 1 included in the grain-oriented electrical steel sheet 100 is not limited and may be within a known range. In a case of obtaining characteristics generally required for a grain-oriented electrical steel sheet, the following is preferably contained as the chemical composition. In the present embodiment, % related to the chemical composition is mass % unless otherwise specified.

C: 0.010% or Less

C (carbon) is an element effective for microstructure control of the steel sheet in steps until the completion of a decarburization annealing step in manufacturing steps. However, when a C content is more than 0.010%, magnetic characteristics of the grain-oriented electrical steel sheet, which is a product sheet, deteriorate. Therefore, in the base steel sheet of the grain-oriented electrical steel sheet according to the present embodiment, the C content is preferably set to 0.010% or less. The C content is more preferably 0.005% or less. The C content is preferably as low as possible. However, even if the C content is reduced to less than 0.0001%, the effect of the microstructure control is saturated and a manufacturing cost only increases. Therefore, the C content may be set to 0.0001% or more.

Si: 2.50% to 4.00%

Si (silicon) is an element that increases electric resistance of the grain-oriented electrical steel sheet and improves iron loss characteristics. When a Si content is less than 2.50%, a sufficient eddy-current loss reduction effect cannot be obtained. Therefore, the Si content is preferably set to 2.50% or more. The Si content is more preferably 2.70% or more, and even more preferably 3.00% or more.

On the other hand, when the Si content is more than 4.00%, the grain-oriented electrical steel sheet becomes embrittled, and passability significantly deteriorates. In addition, workability of the grain-oriented electrical steel sheet deteriorates, and the steel sheet may fracture during rolling. Therefore, the Si content is preferably set to 4.00% or less. The Si content is more preferably 3.80% or less, and even more preferably 3.70% or less.

Mn: 0.01% to 0.50%

Mn (manganese) is an element that is bonded to S in the manufacturing steps to form MnS. These precipitates function as an inhibitor (normal grain growth inhibitor) and cause secondary recrystallization in steel. Mn is an element that further enhances the hot workability of steel. In a case where the Mn content is less than 0.01%, the above effects cannot be sufficiently obtained. Therefore, the Mn content is preferably set to 0.01% or more. The Mn content is more preferably 0.02% or more.

On the other hand, when the Mn content is more than 0.50%, secondary recrystallization is not caused and the magnetic characteristics of the steel deteriorate. Therefore, in the base steel sheet of the grain-oriented electrical steel sheet according to the present embodiment, the Mn content is preferably set to 0.50% or less. The Mn content is more preferably 0.20% or less, and even more preferably 0.10% or less.

N: 0.010% or Less

N (nitrogen) is an element that is bonded to Al in the manufacturing steps to form AlN that functions as an inhibitor. However, when a N content is more than 0.010%, an excessive amount of the inhibitor remains in the grain-oriented electrical steel sheet, and the magnetic characteristics deteriorate. Therefore, in the base steel sheet of the grain-oriented electrical steel sheet according to the present embodiment, the N content is preferably set to 0.010% or less. The N content is more preferably 0.008% or less.

On the other hand, although a lower limit of the N content is not particularly specified, even if the N content is reduced to less than 0.001%, the manufacturing cost only increases. Therefore, the N content may be set to 0.001% or more.

Sol. Al: 0.020% or Less

Acid-soluble aluminum (sol. Al) is an element that is bonded to N in the manufacturing steps of the grain-oriented electrical steel sheet to form AlN that functions as an inhibitor. However, when a sol. Al content of the base steel sheet is more than 0.020%, an excessive amount of the inhibitor remains in the base steel sheet, and the magnetic characteristics deteriorate. Therefore, in the base steel sheet of the grain-oriented electrical steel sheet according to the present embodiment, the sol. Al content is preferably set to 0.020% or less. The sol. Al content is more preferably 0.010% or less and even more preferably less than 0.001%. Although a lower limit of the sol. Al content is not particularly specified, even if the sol. Al content is reduced to less than 0.0001%, the manufacturing cost only increases. Therefore, the sol. Al content may be set to 0.0001% or more.

S: 0.010% or Less

S (sulfur) is an element that is bonded to Mn in the manufacturing steps to form MnS that functions as an inhibitor. However, in a case where a S content is more than 0.010%, the magnetic characteristics deteriorate due to the remaining inhibitor. Therefore, in the base steel sheet of the grain-oriented electrical steel sheet according to the present embodiment, the S content is preferably set to 0.010% or less. The S content in the grain-oriented electrical steel sheet is more preferably as low as possible. For example, the S content is less than 0.001%. However, even if the S content in the grain-oriented electrical steel sheet is reduced to less than 0.0001%, the manufacturing cost only increases. Therefore, the S content in the grain-oriented electrical steel sheet may be set to 0.0001% or more.

Remainder: Fe and Impurities

The chemical composition of the base steel sheet of the grain-oriented electrical steel sheet according to the present embodiment contains the above-described elements (base elements), and a remainder being Fe and impurities. However, for the purpose of enhancing magnetic characteristics and the like, one or more of Sn, Cu, Se, and Sb may be further contained in the ranges shown below. In addition, even if elements other than these, for example, any one or two or more of W, Nb, Ti, Ni, Co, V, Cr, and Mo are contained (whether intentionally or as impurities) in a total amount of 1.0% or less, the effects of the grain-oriented electrical steel sheet according to the present embodiment are not impaired.

Here, the impurities mean elements that are incorporated from ore as raw materials, scrap, or a manufacturing environment when the base steel sheet is industrially manufactured, and are allowed to be contained in amounts that do not adversely affect the actions of the grain-oriented electrical steel sheet according to the present embodiment.

Sn: 0% to 0.50%

Sn (tin) is an element that contributes to an improvement in the magnetic characteristics through primary recrystallization microstructure control. In order to obtain the effect of improving the magnetic characteristics, a Sn content is preferably set to 0.01% or more. The Sn content is more preferably 0.02% or more, and even more preferably 0.03% or more.

On the other hand, in a case where the Sn content is more than 0.50%, the secondary recrystallization becomes unstable, and the magnetic characteristics deteriorate. Therefore, the Sn content is preferably set to 0.50% or less. The Sn content is preferably 0.30% or less, and more preferably 0.10% or less.

Cu: 0% to 0.50%

Cu (copper) is an element that contributes to an increase in a Goss orientation share in a secondary recrystallization structure. In order to obtain the above effect, a Cu content is preferably set to 0.01% or more. The Cu content is more preferably 0.02% or more, and even more preferably 0.03% or more.

On the other hand, in a case where the Cu content is more than 0.50%, the steel sheet becomes embrittled during hot rolling. Therefore, in the base steel sheet of the grain-oriented electrical steel sheet according to the present embodiment, the Cu content is preferably set to 0.50% or less. The Cu content is more preferably 0.30% or less, and even more preferably 0.10% or less.

Se: 0% to 0.020%

Se (selenium) is an element having an effect of improving the magnetic characteristics. In a case where Se is contained, a Se content is preferably set to 0.001% or more in order to satisfactorily exhibit the effect of improving the magnetic characteristics. The Se content is more preferably 0.003% or more, and even more preferably 0.006% or more.

On the other hand, when the Se content is more than 0.020%, adhesion of the coating deteriorates. Therefore, the Se content is preferably set to 0.020% or less. The Se content is more preferably 0.015% or less, and even more preferably 0.010% or less.

Sb: 0% to 0.50%

Sb (antimony) is an element having an effect of improving magnetic characteristics. In a case where Sb is contained, an Sb content is preferably set to 0.005% or more in order to satisfactorily exhibit the effect of improving the magnetic characteristics. The Sb content is more preferably 0.01% or more, and even more preferably 0.02% or more.

On the other hand, when the Sb content is more than 0.50%, the adhesion of the coating significantly deteriorates. Therefore, the Sb content is preferably set to 0.50% or less. The Sb content is more preferably 0.30% or less, and even more preferably 0.10% or less.

As described above, as an example, the base steel sheet of the grain-oriented electrical steel sheet in the present embodiment contains, as the chemical composition, the above-described base elements and the remainder being Fe and impurities, or contains the base elements and further contains one or more of other optional elements and the remainder being Fe and impurities.

The chemical composition of the base steel sheet of the grain-oriented electrical steel sheet according to the present embodiment can be measured using a known ICP atomic emission spectrometry. Si is obtained by a method specified in JIS G 1212 (1997) (Methods for determination of silicon content). Specifically, when the chips are dissolved in an acid, silicon oxide precipitates as a precipitate. This precipitate (silicon oxide) is filtered out with filter paper, and a mass thereof is measured to obtain the Si content.

The C content and the S content are obtained by a well-known high frequency combustion method (combustion-infrared absorption method). Specifically, the above-described solution is burned by high frequency heating in an oxygen gas stream, and carbon dioxide and sulfur dioxide thus generated are detected to obtain the C content and the S content are obtained.

The N content is obtained using a well-known inert gas fusion-thermal conductivity method.

However, when the measurement is performed, in a case where the insulating coating is formed on the surface, the measurement is performed after peeling off the insulating coating. As a peeling method, the insulating coating can be peeled off by being immersed in a high-concentration alkaline solution (for example, a 30% sodium hydroxide solution heated to 85° C.) for 20 minutes or longer. Whether or not the peeling has occurred can be visually determined. In a case of a small sample, the peeling may be performed by surface grinding.

(Etch Pit Structure)

Figure 2:
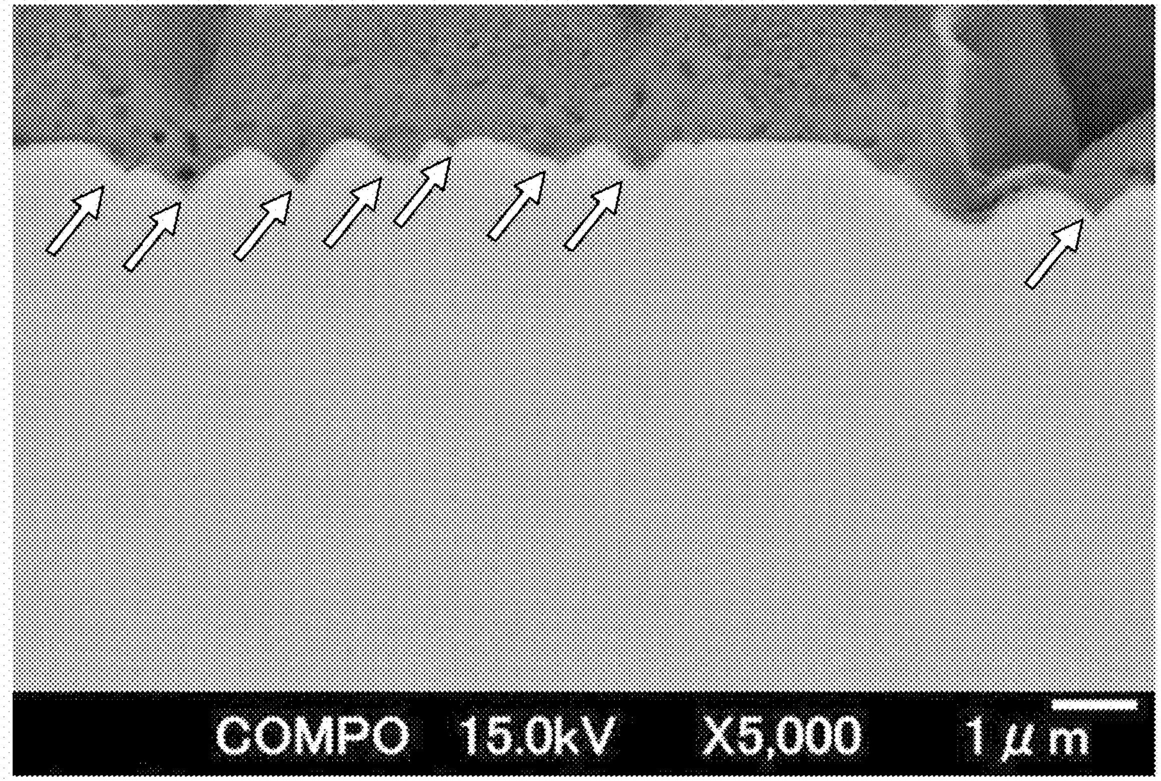
FIG. 2 is a cross-sectional image showing an example of an etch pit structure of the grain-oriented electrical steel sheet according to the present embodiment.

As shown in FIG. 2, the grain-oriented electrical steel sheet 100 according to the present embodiment has the etch pit structure 12 (etch pits (portions indicated by arrows in FIG. 2) are formed) on the surface of the base steel sheet 1.

The etch pit structure is a rectangular structure formed of etch pits formed by corrosion of a (110) plane, which is a crystal structure of the grain-oriented electrical steel sheet, and is a structure in which the surface of the steel sheet appears to be coated with minute rectangles in a case where the surface of the grain-oriented electrical steel sheet is observed with a scanning electron microscope (SEM) at a predetermined magnification (5,000-fold in FIG. 2). In the present embodiment, a rectangular structure in which a size (average size) of one structure is about 0.01 to 0.10 μm in a rolling direction of the grain-oriented electrical steel sheet, which is the base steel sheet, and about 0.005 to 0.050 μm in an orthogonal direction, which is a direction orthogonal to the rolling direction, is defined as the etch pit structure.

It is presumed that, when an intermediate layer, which will be described later, is formed on the base steel sheet having such an etch pit structure, the etch pit portion serves as an origin for the formation of a dense intermediate layer, and an effect of improving adhesion is obtained.

In the etch pit structure of the grain-oriented electrical steel sheet according to the present embodiment, as shown in FIG. 2, a base angle of a recessed part is about 90° since a crystal orientation (in which sharp GOSS orientation is increased) of a base metal is reflected.

An area ratio, which is a ratio of an area occupied by the rectangular fine structure as described above on the surface of the base steel sheet, is preferably 5% or more in a case of obtaining a sufficient effect. By causing the fine structure as described above to have an area ratio of 10% or more, the adhesion between the grain-oriented electrical steel sheet which is the base steel sheet and the tension-applying coating is further improved. The area ratio is more preferably 15%, and even more preferably 20%. An upper limit of the area ratio is not particularly specified, but a value of the area ratio does not have to be very large because the intermediate layer itself also has the effect of adhesion to the steel sheet.

In the grain-oriented electrical steel sheet which is the base steel sheet, most crystal orientations are <110> (001). Therefore, in a case where a cross section in a thickness direction of the steel sheet in the direction orthogonal to the rolling direction is observed, the etch pit appears as a linear dimple having an included angle of 45°. Therefore, the area ratio of the etch pit structure can be measured by measuring lengths occupied by the dimples caused by the etch pits in the measured lengths.

<Insulating Coating>

In the grain-oriented electrical steel sheet 100 according to the present embodiment, the insulating coating 2 is formed on the surface of the base steel sheet 1. More specifically, the grain-oriented electrical steel sheet 100 according to the present embodiment does not have a forsterite-based coating. In addition, a $SiO_2$ layer as shown in Patent Documents 3 and 4 is also not provided. Therefore, the insulating coating 2 is formed in direct contact with the base steel sheet 1.

In addition, the insulating coating 2 includes the intermediate layer 21 and the tension coating layer 22 in order from the base steel sheet 1 side.

(Intermediate Layer)

The intermediate layer 21 is a layer (coating) containing a crystalline metal phosphate and having a thickness of 0.2 to 10.0 μm.

As described above, in general, a grain-oriented electrical steel sheet has a forsterite-based coating generated in a secondary recrystallisation annealing step and an insulating coating (tension insulating coating) formed thereon. However, in recent years, it has become clear that this forsterite-based coating hinders movement of magnetic domain walls and has an adverse effect on iron loss, and a grain-oriented electrical steel sheet without a forsterite-based coating has been examined in order to further improve magnetic characteristics. However, in a case where the forsterite-based coating is not present, it is difficult to secure sufficient adhesion between the tension coating and the surface of the base steel sheet.

In the grain-oriented electrical steel sheet according to the present embodiment, the intermediate layer 21 containing the crystalline metal phosphate is formed between the base steel sheet 1 and the tension coating, whereby the adhesion between the base steel sheet 1 and the tension coating layer 22 is improved through the intermediate layer 21.

This is because when the intermediate layer 21 contains the crystalline metal phosphate, the tension coating (which becomes the tension coating layer 22 after formation) formed on the intermediate layer 21 also contains the metal phosphate and thus has a high affinity, and the adhesion between the intermediate layer and the tension coating layer is excellent. In addition, as will be described later, in a case where the intermediate layer is formed by immersion in a treatment liquid containing a metal phosphate, the intermediate layer can be formed on the surface of the base steel sheet 1 by utilizing a chemical reaction, the adhesion between the intermediate layer 21 and the base steel sheet 1 can also be secured.

In a case where the intermediate layer 21 does not contain a crystalline metal phosphate, the above effect cannot be obtained. A proportion of the crystalline metal phosphate in the intermediate layer is preferably 80 mass % or more, and more preferably 90 mass % or more, and may be 100 mass %. The metal phosphate is one or two or more of zinc phosphate, manganese phosphate, iron phosphate, and zinc calcium phosphate in terms of adhesion.

In terms of the adhesion to the base steel sheet, in the metal phosphate, the total amount (mol) of a metal (M) and Fe is preferably 2.0 times or more, and more preferably 3.0 times or more the amount (mol) of P.

When the metal phosphate is a hydrate, corrosion resistance decreases. Therefore, it is preferable that the metal phosphate is not a hydrate. In the hydrate, the total amount (mol) of the above-described metal (M) and Fe is generally 1.5 times or less the amount (mol) of P. Even in the grain-oriented electrical steel sheet according to the present embodiment, there are cases where a hydrate unavoidably generated in a process of forming the intermediate layer finally remains, but in a small amount (usually, less than 5.0 mass % of the entire insulating coating 2).

From the viewpoint of adhesion, colloidal silica is not contained in the treatment liquid when the intermediate layer is formed. There are cases where a remainder other than the metal phosphate in the intermediate layer contains an oxide or an element such as Fe or Si diffused from the base steel sheet, but silica is not intentionally contained as described above. Therefore, the Si content is, for example, 1.0 mass % or less.

Although the intermediate layer 21 is formed at a time different from that of the tension coating formed on the intermediate layer 21, both the intermediate layer 21 and the tension coating layer 22 are effective as the insulating coating 2.

The amount (mol) of the metal (M), the amount (mol) of Fe, and the amount (mol) of P in the metal phosphate are obtained by analyzing a cross section of the insulating coating in a thickness direction using energy dispersive X-ray spectroscopy (EDS). The measurement is performed at about three places, and an average value thereof is regarded as the amount (mol) of the corresponding element.

In addition, the amount of the hydrate can be roughly obtained by measuring the amount of water by a thermobalance method.

An average thickness of the intermediate layer 21 is 0.2 to 10.0 μm.

When the average thickness of the intermediate layer 21 is less than 0.2 μm, the effect of improving the adhesion between the base steel sheet and the insulating coating via the intermediate layer is not sufficient. On the other hand, when the average thickness of the intermediate layer is more than 10.0 μm, the deterioration of the magnetic characteristics becomes significant.

(Tension Coating Layer)

In the grain-oriented electrical steel sheet according to the present embodiment, the tension coating layer 22 is provided on the surface side of the insulating coating 2 by forming the tension coating on a surface of the intermediate layer 21.

The tension coating layer 22 is not particularly limited as long as the tension coating layer 22 is used as an insulating coating of the grain-oriented electrical steel sheet, but from the viewpoint of the adhesion to the intermediate layer 21 (adhesion to the base steel sheet 1 via the intermediate layer 21), contains a metal phosphate and silica (derived from colloidal silica in the coating liquid) so that a silica content is 20 mass % or more. On the other hand, when the silica content of the tension coating layer is more than 60 mass %, silica causes pulverization. Therefore, the silica content of the tension coating layer is set to 60 mass % or less.

The tension coating layer 22 preferably contains 70 mass % or more of the metal phosphate and silica in total. There are cases where a remainder other than the metal phosphate and silica contains ceramic fine particles such as alumina and silicon nitride.

A thickness of the tension coating layer 22 is not limited, but an average thickness of the insulating coating 2 (the intermediate layer 21+the tension coating layer 22) is set to 2.0 to 10.0 μm in a case where the average thickness of the intermediate layer 21 is within the above range. When the average thickness of the insulating coating 2 is less than 2.0 μm, a sufficient coating tension cannot be obtained. In addition, the elution of phosphoric acid increases. In this case, stickiness or a decrease in corrosion resistance may be incurred, and this may cause peeling of the coating. In addition, when the thickness of the insulating coating 2 is more than 10.0 μm, a lamination factor thereof decreases and the magnetic characteristics deteriorate, or cracks or the like cause a decrease in the adhesion or a decrease in the corrosion resistance.

The thickness of the insulating coating 2 is obtained by the following method.

An average thickness can be measured by observing a cross section of a sample with a scanning electron microscope and measuring thicknesses at five or more points. In the insulating coating 2, the intermediate layer 21 and the tension coating layer 22 can be distinguished from each other by the amount of silicon (Si) derived from silica (the tension coating layer contains silica as described above).

In addition, the average thickness of the insulating coating 2 can be obtained by summing up the average thickness of the intermediate layer 21 and the average thickness of the tension coating layer 22.

In the intermediate layer 21 and the tension coating layer 22, a mass proportion of the metal phosphate and a type of the metal phosphate can be obtained by the following methods.

Similar to the method for measuring the thicknesses of the intermediate layer 21 and the tension coating layer 22, the mass proportion of the metal phosphate and the type of the metal phosphate can be specified by using a scanning electron microscope and an energy dispersive element analyzer.

In addition, whether or not the metal phosphate of the intermediate layer 21 is a crystalline metal phosphate can be determined by an X-ray crystal structure analysis method.

In addition, the silica content of the tension coating layer 22 can be measured by using a scanning electron microscope and an energy dispersive element analyzer.

<Manufacturing Method>

According to a manufacturing method satisfying manufacturing conditions described below, the grain-oriented electrical steel sheet according to the present embodiment can be suitably manufactured. However, as a matter of course, the grain-oriented electrical steel sheet according to the present embodiment is not particularly limited to the manufacturing method. That is, the grain-oriented electrical steel sheet having the above-described configuration is regarded as the grain-oriented electrical steel sheet according to the present embodiment, regardless of the manufacturing conditions thereof.

The grain-oriented electrical steel sheet according to the present embodiment can be manufactured by a manufacturing method including:

(I) a hot rolling step of performing hot rolling on a steel piece having a predetermined chemical composition to obtain a hot-rolled sheet (hot-rolled steel sheet);

(II) a hot-rolled sheet annealing step of annealing the hot-rolled sheet;

(III) a cold rolling step of performing cold rolling on the hot-rolled sheet after the hot-rolled sheet annealing to obtain a steel sheet (cold-rolled sheet);

(IV) a decarburization annealing step of performing decarburization annealing on the steel sheet;

(V) a secondary recrystallisation annealing step of applying an annealing separating agent containing 10 to 100 mass % of $Al_2O_3$ to the steel sheet after the decarburization annealing step, drying the steel sheet, and thereafter performing secondary recrystallisation annealing on the steel sheet;

(VI) an annealing separating agent removing step of removing an excess amount of the annealing separating agent from the steel sheet after the secondary recrystallisation annealing step;

(VII) an acid treatment step of immersing the steel sheet after the annealing separating agent removing step in a mixed acid in which a concentration of one or two or more selected from sulfuric acid, phosphoric acid, and nitric acid is 0.5 to 20 wt % and a liquid temperature is 40° C. to 90° C. for 5 to 50 seconds;

(VIII) an immersion step of immersing the steel sheet after the acid treatment step in a treatment liquid containing 5 to 50 mass % of a metal phosphate at a liquid temperature of 40° C. to 85° C. for 5 to 150 seconds;

(IX) a drying step of pulling up the steel sheet after the immersion step from the treatment liquid, removing an excess amount of the treatment liquid, and thereafter drying the steel sheet; and (X) a tension coating layer forming step of applying a coating liquid containing a metal phosphate and colloidal silica so that the amount of the colloidal silica is 30 to 150 parts by mass with respect to 100 parts by mass of the metal phosphate to the steel sheet after the drying step, drying the steel sheet, and thereafter holding the steel sheet in a state in which a sheet temperature is 700° C. to 950° C. for 10 to 120 seconds.

In addition, the manufacturing method of the grain-oriented electrical steel sheet according to the present embodiment may further include any one or both of (XI) a nitriding treatment step of performing a nitriding treatment on the steel sheet between the decarburization annealing step and the secondary recrystallisation annealing step, and (XII) a magnetic domain refinement step of performing magnetic domain control on the steel sheet after the tension coating layer forming step.

In addition, in the manufacturing method of the grain-oriented electrical steel sheet according to the present embodiment may further include, between the annealing separating agent removing step and the immersion step, (XIII) a surface adjusting step of controlling reactivity of a surface of the steel sheet.

Among the steps, the manufacturing of the grain-oriented electrical steel sheet according to the present embodiment is characterized by the steps from (V) the secondary recrystallisation annealing step to (X) the tension coating layer forming step, which are mainly related to the formation of the insulating coating, and known conditions can be adopted for the other steps or conditions not described.

Hereinafter, these steps will be described.

<Hot Rolling Step>

In the hot rolling step, a steel piece such as a slab having a predetermined chemical composition is heated and thereafter hot-rolled to obtain a hot-rolled sheet. A heating temperature of the steel piece is preferably set to be in a range of 1,100° C. to 1,450° C. The heating temperature is more preferably 1,300° C. to 1,400° C.

The chemical composition of the steel piece may be changed depending on the chemical composition of the grain-oriented electrical steel sheet to be finally obtained. For example, by mass %, C: 0.01% to 0.20%, Si: 2.50% to 4.00%, sol. Al: 0.01% to 0.040%, Mn: 0.01% to 0.50%, N: 0.020% or less, S: 0.005% to 0.040%, Cu: 0% to 0.50%, Sn: 0% to 0.50%, Se: 0% to 0.020%, Sb: 0% to 0.50%, and a remainder being Fe and impurities may be contained as an example of the chemical composition.

Hot rolling conditions are not particularly limited and may be appropriately set based on required characteristics. A sheet thickness of the hot-rolled sheet is preferably in a range of, for example, 2.0 mm or more and 3.0 mm or less.

<Hot-Rolled Sheet Annealing Step>

The hot-rolled sheet annealing step is a step of annealing the hot-rolled sheet manufactured through the hot rolling step. By performing such an annealing treatment, recrystallization occurs in a structure of the steel sheet, and good magnetic characteristics can be realized, which is preferable.

In a case of performing the hot-rolled sheet annealing, the hot-rolled sheet manufactured through the hot rolling step may be annealed according to a known method. A measure for heating the hot-rolled sheet during the annealing is not particularly limited, and a known heating method can be adopted. In addition, annealing conditions are not particularly limited. For example, the hot-rolled sheet can be annealed in a temperature range of 900° C. to 1,200° C. for 10 seconds to 5 minutes.

<Cold Rolling Step>

In the cold rolling step, cold rolling is performed on the hot-rolled sheet after the hot-rolled sheet annealing step to obtain a steel sheet (cold-rolled sheet). As the cold rolling, cold rolling may be performed once (a series of passes without annealing in between), or cold rolling may be performed a plurality of times with process annealing in between by stopping cold rolling before the final pass of the cold rolling step and performing process annealing at least once or two or more times.

In a case of performing the process annealing, the holding is preferably performed at a temperature of 1,000° C. to 1,200° C. for 5 to 180 seconds. An annealing atmosphere is not particularly limited. The number of times of the process annealing performed is preferably 3 or less in consideration of the manufacturing cost.

In addition, a surface of the hot-rolled sheet may be pickled before the cold rolling step.

In the cold rolling step according to the present embodiment, the hot-rolled sheet after the hot-rolled sheet annealing step may be cold-rolled to obtain a steel sheet according to a known method. For example, a final rolling reduction can be in a range of 80% to 95%. When the final rolling reduction is 80% or more, Goss grain having a sharp Goss orientation in which a {110}<001> orientation is aligned in a rolling direction can be obtained, which is preferable. On the other hand, in a case where the final rolling reduction is more than 95%, secondary recrystallization is highly likely to become unstable in the subsequent secondary recrystallisation annealing step, which is not preferable.

The final rolling reduction is a cumulative rolling reduction of the cold rolling, and is a cumulative rolling reduction of cold rolling after the final process annealing in a case where process annealing is performed.

<Decarburization Annealing Step>

In the decarburization annealing step, decarburization annealing is performed on the obtained steel sheet after the cold rolling step. In the decarburization annealing, decarburization annealing conditions are not limited as long as the steel sheet can be primary recrystallized and C, which adversely affects the magnetic characteristics, can be removed from the steel sheet. However, as an example, holding at an annealing temperature of 800° C. to 900° C. is performed with an oxidation degree ($PH_2O/PH_2$) of 0.3 to 0.6 in an annealing atmosphere (in-furnace atmosphere) for 10 to 600 seconds.

<Nitriding Treatment Step>

A nitriding treatment may be performed between the decarburization annealing step and the secondary recrystallisation annealing step described below.

In the nitriding treatment step, for example, the nitriding treatment is performed by holding the steel sheet after the decarburization annealing step at about 700° C. to 850° C. in a nitriding treatment atmosphere (an atmosphere containing a gas having a nitriding ability such as hydrogen, nitrogen, and ammonia). In a case where AlN is utilized as an inhibitor, it is preferable that the N content of the steel sheet after the nitriding treatment step is set to 40 ppm or more by the nitriding treatment. On the other hand, in a case where the N content of the steel sheet after the nitriding treatment step is more than 1,000 ppm, an excessive amount of AlN is present in the steel sheet even after the completion of the secondary recrystallization in the secondary recrystallisation annealing. Such AlN causes iron loss deterioration. Therefore, the N content of the steel sheet after the nitriding treatment step is preferably set to 1,000 ppm or less.

<Secondary Recrystallisation Annealing Step>

In the secondary recrystallisation annealing step, an annealing separating agent containing 10 to 100 mass % of $Al_2O_3$ is applied to the steel sheet after the decarburization annealing step or further after the nitriding treatment (after the nitriding treatment step) and dried, and thereafter secondary recrystallisation annealing is performed.

In a manufacturing method of a grain-oriented electrical steel sheet in the related art, a forsterite-based coating is formed on a surface of a steel sheet (cold-rolled sheet) by applying an annealing separating agent primarily containing MgO and performing secondary recrystallisation annealing. On the other hand, in the manufacturing method of the grain-oriented electrical steel sheet according to the present embodiment, the annealing separating agent containing $Al_2O_3$ is used so as not to form a forsterite-based coating.

On the other hand, a proportion of $Al_2O_3$ may be 100 mass %. However, from the viewpoint of preventing $Al_2O_3$ from seizing on the surface of the steel sheet, in the manufacturing method of the grain-oriented electrical steel sheet according to the present embodiment, the annealing separating agent preferably contains MgO. A proportion of MgO may be 0%. However, in a case of obtaining the above effect, the proportion of MgO is preferably set to 5 mass % or more. In a case where MgO is contained, the proportion of MgO is set to 90 mass % or less in order to secure 10 mass % or more of $Al_2O_3$. The proportion of MgO is preferably 50 mass % or less.

In addition, in the manufacturing method of the grain-oriented electrical steel sheet according to the present embodiment, the annealing separating agent may further contain a chloride. When the annealing separating agent contains a chloride, an effect of hindering the formation of a forsterite-based coating can be obtained. A chloride content is not particularly limited and may be 0%. However, in a case of obtaining the above effect, the chloride content is preferably 0.5 to 10 mass %. As the chloride, for example, bismuth chloride, calcium chloride, cobalt chloride, iron chloride, and nickel chloride are effective.

Although secondary recrystallisation annealing conditions are not limited, for example, conditions in which holding at a temperature of 1,150° C. to 1,250° C. is performed for 10 to 60 hours can be adopted.

<Annealing Separating Agent Removing Step>

An excess amount of the annealing separating agent is removed from the steel sheet after the secondary recrystallisation annealing step. For example, an excess amount of the annealing separating agent can be removed by washing with water.

<Acid Treatment Step>

The steel sheet after the annealing separating agent removing step is immersed in a mixed acid in which a concentration of one or two or more selected from sulfuric acid, phosphoric acid, and nitric acid is 0.5 to 20 wt % and a liquid temperature is 40° C. to 90° C. for 5 to 50 seconds to form etch pits on the surface. The above conditions cause a difference in corrosion rate depending on crystal orientations, and under these conditions, predetermined etch pits are formed.

When the acid for the immersion is an acid other than sulfuric acid, phosphoric acid, and nitric acid, the formation of etch pits is insufficient, and the adhesion becomes inferior.

When the concentration of the acid is less than 0.5 wt %, it takes a long time to form etch pits, and the formation of etch pits is insufficiently performed by a usual treatment. When the concentration of the acid is more than 20 wt %, the solubility of the acid is too high, and it becomes difficult to form etch pits, so that the adhesion becomes inferior.

When the liquid temperature is lower than 40° C., it takes a long time to form etch pits, which is inferior in terms of cost. When the liquid temperature is higher than 90° C., the solubility of the acid is too high, and it becomes difficult to form etch pits, so that the adhesion becomes inferior. When an immersion time is shorter than 5 seconds, the formation of etch pits is insufficient and the adhesion becomes inferior. When the immersion time is longer than 50 seconds, iron is excessively dissolved, and it becomes difficult to form etch pits, so that the adhesion becomes inferior.

<Surface Adjusting Step>

The surface adjusting step of controlling reactivity of the surface of the steel sheet may be performed between the annealing separating agent removing step and the immersion step.

Although conditions of the surface adjusting step are not limited, conditions in which the steel sheet after the annealing separating agent removing step is immersed in a commercially available surface adjusting agent for 30 seconds to 1 minute can be used as an example.

<Immersion Step>

<Drying Step>

The steel sheet after the acid treatment step (or further after performing the surface adjusting step as necessary) is immersed in a treatment liquid containing 5 to 50 mass % of a predetermined metal phosphate at a liquid temperature of 40° C. to 85° C. for 5 to 150 seconds (immersion step). Thereafter, the steel sheet is pulled up from the treatment liquid, an excess amount of the treatment liquid is removed, and thereafter the steel sheet is dried (drying step). Accordingly, an intermediate layer containing a crystalline metal phosphate is formed on the surface of the steel sheet (base steel sheet).

When the liquid temperature is lower than 40° C. or an immersion time is shorter than 5 seconds, an intermediate layer having a sufficient thickness cannot be obtained. On the other hand, when the liquid temperature is higher than 85° C. or the immersion time is longer than 150 seconds, a thickness of the intermediate layer becomes excessive.

In addition, when the amount of the metal phosphate in the treatment liquid is less than 5 mass %, the formation of the intermediate layer is slow and an industrially high cost is incurred. In addition, in a case where the thickness of the intermediate layer is made uniform, the amount of the metal phosphate is preferably 10 mass % or more. On the other hand, when the amount of the metal phosphate is more than 50 mass %, crystal grains may be coarsened and cause a decrease in adhesion. The metal phosphate contained in the treatment liquid may be one or two or more of zinc phosphate, manganese phosphate, and zinc calcium phosphate.

In addition, when a drying temperature is high, there is a concern that voids are generated and the adhesion becomes inferior. Therefore, the drying temperature is preferably set to 300° C. or lower. The drying temperature is more preferably 200° C. or lower. The drying temperature is preferably 100° C. or higher.

<Tension Coating Layer Forming Step>

In the tension coating layer forming step, a solution (coating liquid) containing a metal phosphate and colloidal silica is applied to the steel sheet after the drying step (the steel sheet in which the intermediate layer is formed on the base steel sheet) and dried, and thereafter the steel sheet is held in a state in which a sheet temperature is 700° C. to 950° C. for 10 to 120 seconds to form a tension coating. A layer formed of the tension coating (tension coating layer 22) and the intermediate layer 21 become the insulating coating 2.

When the sheet temperature is lower than 700° C., the magnetic characteristics become inferior due to a low tension. Therefore, the sheet temperature is preferably set to 700° C. or higher. On the other hand, when the sheet temperature is higher than 950° C., stiffness of the steel sheet decreases and the steel sheet is easily deformed. In this case, there are cases where the steel sheet undergoes strain due to transfer or the like and the magnetic characteristics become inferior. Therefore, the sheet temperature is preferably set to 950° C. or lower.

In addition, when a holding time is shorter than 10 seconds, an elution property becomes inferior. Therefore, the holding time is set to 10 seconds or longer. On the other hand, when the holding time is longer than 120 seconds, productivity becomes inferior. Therefore, the holding time is preferably 120 seconds or shorter.

The coating liquid contains the metal phosphate and colloidal silica so that colloidal silica is contained in an amount of 30 to 150 parts by mass with respect to 100 parts by mass of the metal phosphate. As the metal phosphate, for example, one or a mixture of two or more selected from aluminum phosphate, zinc phosphate, magnesium phosphate, nickel phosphate, copper phosphate, lithium phosphate, barium phosphate, cobalt phosphate, strontium phosphate, and the like can be used.

The coating liquid may contain vanadium, tungsten, molybdenum, zirconium, and the like as additional elements. In a case where these elements are contained, these elements can be added to the coating liquid, for example, in the form of an oxyacid.

As colloidal silica, S-type or C-type colloidal silica can be used. The S type of colloidal silica refers to a colloidal silica in which silica solution is alkaline, and the C type refers to a colloidal silica in which silica solution is alkaline to neutral and in which an aluminum treatment is performed on a surface of silica particles. The S-type colloidal silica is widely used and relatively inexpensive, but there is a concern that the S-type colloidal silica aggregates and precipitates when mixed with an acidic metal phosphate solution. Therefore, caution is required. The C-type colloidal silica is stable even when mixed with a metal phosphate solution, and there is no concern of precipitation. However, the number of treatment steps is large and the C-type colloidal silica is relatively expensive. It is preferable to use the colloidal silica properly depending on the stability of the coating liquid to be prepared.

<Magnetic Domain Refinement Step>

The manufacturing method of the grain-oriented electrical steel sheet according to the present embodiment may further include the magnetic domain refinement step of performing magnetic domain refinement on the steel sheet.

By performing a magnetic domain refinement treatment, the iron loss of the grain-oriented electrical steel sheet can be further reduced.

As a method of the magnetic domain refinement treatment, there is a method of narrowing a width of a 180° magnetic domain (refining a 180° magnetic domain) by forming linear or dot-shaped groove parts extending in a direction intersecting a rolling direction at predetermined intervals along the rolling direction, and as a method of a magnetic domain control treatment, in a case where the magnetic domain control treatment is performed after forming the insulating coating, there is a method of narrowing a width of a 180° magnetic domain (refining a 180° magnetic domain) by forming linear or dot-shaped stress strain portions or groove parts extending in a direction intersecting a rolling direction at predetermined intervals along the rolling direction.

In the case of forming the stress strain portions, laser beam irradiation, electron beam irradiation, or the like can be applied. In the case of forming the groove parts, a mechanical groove forming method using a gear or the like, a chemical groove forming method for forming a groove by electrolytic etching, a thermal groove forming method using laser irradiation, or the like can be applied.

In a case where the insulating coating is damaged due to the formation of the stress strain portions or the groove parts and the characteristics such as insulation properties deteriorate, the insulating coating may be formed again to repair the damage.

EXAMPLES

A slab containing, by mass %, C: 0.08%, Si: 3.29%, sol. Al: 0.028%. N: 0.008%, Mn: 0.15%. S: 0.007%, and a remainder being Fe and impurities was cast.

This slab was heated to 1,350° C. and thereafter hot-rolled to obtain a hot-rolled sheet having a sheet thickness of 2.2 mm.

This hot-rolled sheet was annealed at 1,100° C. for 10 seconds (hot-rolled sheet annealing) and thereafter cold-rolled until the sheet thickness became 0.22 mm to obtain a steel sheet.

This steel sheet was subjected to decarburization annealing in an atmosphere of ($PH_2O/PH_2$) of 0.4 at 830° C. for 90 seconds.

Thereafter, excluding No. 115, an annealing separating agent containing 48 mass % of $Al_2O_3$, 48 mass % of MgO, and 4 mass % of bismuth chloride was applied to the steel sheet, and dried, and thereafter secondary recrystallisation annealing was performed on the steel sheet at 1,200° C. for 20 hours. For No. 115, an annealing separating agent containing only $Al_2O_3$ (100 mass %) was applied to the steel sheet and dried, and thereafter secondary recrystallisation annealing was performed on the steel sheet at 1,200° C. for 20 hours.

When an excess amount of the annealing separating agent was removed from the steel sheet after the secondary recrystallisation annealing step by washing with water, no forsterite-based coating was formed on a surface of the steel sheet.

As shown in Table 2, this steel sheet was subjected to an acid treatment in which the steel sheet was immersed in an acid under any of the conditions of Table 1 to form etch pits.

Thereafter, the steel sheet was immersed in the treatment liquid shown in Table 2 and thereafter heated to 100° C. to 150° C. and dried to form an intermediate layer. An average thickness of the intermediate layer was as shown in Table 2.

As a result of an X-ray crystal structure analysis method, metal phosphates in the intermediate layers of Nos. 101 to 126 were all crystalline metal phosphates. In these crystalline metal phosphates, a ratio between the total amount (mol) of a metal (M) and Fe and the amount of P (mol) was approximately 2:1 or 3:1.

TABLE 1

| Condition | Acid treatment | | |
|---|---|---|---|
| | | Treatment conditions | |
| No. | Treatment Liquid | Temperature (° C.) | Time (sec) |
| 1 | 5 wt % sulfuric acid | 85 | 15 |
| 2 | 10 wt % phosphoric acid | 85 | 10 |
| 3 | 10 wt % sulfuric acid + 2 wt % nitric acid | 80 | 5 |

TABLE 1-continued

| Condition | Acid treatment | | |
|---|---|---|---|
| | | Treatment conditions | |
| No. | Treatment Liquid | Temperature (° C.) | Time (sec) |
| 4 | 2 wt % sulfuric acid + 3 wt % phosphoric acid | 85 | 45 |
| 5 | 20 wt % phosphoric acid | 80 | 12 |
| 6 | 0.3 wt % sulfuric acid | 85 | 10 |
| 7 | 10 wt % sulfuric acid + 25 wt % phosphoric acid | 80 | 15 |
| 8 | 5 wt % sulfuric acid | 85 | 3 |
| 9 | 5 wt % sulfuric acid | 85 | 100 |
| 10 | 5 wt % hydrochloric acid | 80 | 15 |

TABLE 2

| | | | Immersion step | | | | Intermediate layer | | |
|---|---|---|---|---|---|---|---|---|---|
| No. | Acid treatment condition No. | Area ratio of etch pit structure to surface area (%) | Metal phosphate contained in treatment liquid | Amount of metal phosphate in treatment liquid (mass %) | Treatment conditions Temperature (° C.) | Treatment conditions Time (sec) | Metal phosphate detected at 5 mass % or more | Proportion of metal phosphate (mass %) | Average thickness (μm) |
| 101 | 1 | 35 | Zinc phosphate | 20 | 40 | 30 | Zinc phosphate | 94 | 1.2 |
| 102 | 2 | 25 | Zinc phosphate | 20 | 40 | 30 | Zinc phosphate | 94 | 0.7 |
| 103 | 3 | 8 | Manganese phosphate | 35 | 80 | 10 | Manganese phosphate + iron phosphate | 98 | 2.1 |
| 104 | 4 | 30 | Zinc phosphate | 20 | 40 | 30 | Zinc phosphate | 92 | 0.9 |
| 105 | 5 | 10 | Manganese phosphate | 35 | 80 | 15 | Manganese phosphate + iron phosphate | 98 | 4.5 |
| 106 | 1 | 25 | Manganese phosphate | 13 | 60 | 30 | Manganese phosphate | 94 | 3.2 |
| 107 | 2 | 55 | Zinc phosphate | 16 | 40 | 10 | Zinc phosphate | 92 | 0.4 |
| 108 | 3 | 8 | Manganese phosphate | 35 | 75 | 60 | Manganese phosphate + iron phosphate | 98 | 3.6 |
| 109 | 4 | 70 | Zinc calcium phosphate | 12 | 75 | 20 | Zinc calcium phosphate | 90 | 1.6 |
| 110 | 5 | 15 | Manganese phosphate | 10 | 60 | 25 | Manganese phosphate | 98 | 2.4 |
| 111 | 1 | 40 | Zinc phosphate | 20 | 40 | 6 | Zinc phosphate | 94 | 0.6 |
| 112 | 2 | 20 | Manganese phosphate | 13 | 65 | 140 | Manganese phosphate | 98 | 4.1 |
| 113 | 3 | 10 | Manganese phosphate | 13 | 65 | 100 | Manganese phosphate | 98 | 3.8 |
| 114 | 4 | 35 | Zinc phosphate | 20 | 45 | 60 | Zinc phosphate | 94 | 1.4 |
| 115 | 5 | 65 | Zinc phosphate | 20 | 45 | 60 | Zinc phosphate | 94 | 1.9 |
| 116 | 6 | 3 | Zinc phosphate | 20 | 40 | 30 | Zinc phosphate | 94 | 1.2 |
| 117 | 7 | 0 | Zinc phosphate | 20 | 40 | 30 | Zinc phosphate | 94 | 0.6 |
| 118 | 8 | 3 | Zinc phosphate | 20 | 40 | 30 | Zinc phosphate | 94 | 0.9 |
| 119 | 9 | 0 | Manganese phosphate | 35 | 80 | 15 | Manganese phosphate | 98 | 3.3 |
| 120 | 10 | 0 | Manganese phosphate | 35 | 80 | 15 | Manganese phosphate | 98 | 3.4 |
| 121 | 1 | 30 | Manganese phosphate | 35 | 40 | 3 | Manganese phosphate | 97 | 0.1 |
| 122 | 1 | 30 | Manganese phosphate | 35 | 90 | 160 | Manganese phosphate | 96 | 12.8 |
| 123 | 1 | 25 | Zinc phosphate | 20 | 40 | 6 | Zinc phosphate | 96 | 0.8 |
| 124 | 1 | 35 | Manganese phosphate | 10 | 80 | 120 | Manganese phosphate | 94 | 3.4 |
| 125 | 2 | 20 | Zinc phosphate | 20 | 40 | 30 | Zinc phosphate | 96 | 0.9 |
| 126 | 2 | 20 | Zinc phosphate | 20 | 40 | 30 | Zinc phosphate | 94 | 1.1 |

The steel sheet in which the intermediate layer was formed was cut into a plurality of pieces as necessary, a coating liquid containing the metal phosphate and colloidal silica shown in Table 3 was applied to each of the plurality of pieces of the steel sheet and baked in a drying furnace for the time shown in Table 3 so that the sheet temperature reaches the temperature shown in Table 3, whereby a tension coating was formed on the surface. In a case where vanadium, tungsten, molybdenum, and zirconium were contained in the coating liquid, vanadium, tungsten, molybdenum, and zirconium were added at the molar ratios shown in Table 3 in the form of oxyacids ($V_2O_4$, $WO_3$, $MoO_3$, and $ZrO_2$). The thickness of the tension coating layer was changed by changing the amount of the coating liquid applied during the formation. A part of the coating liquid contained alumina or silicon nitride as a remainder.

Accordingly, steel sheet (grain-oriented electrical steel sheet) Nos. 101 to 126 were manufactured.

For these steel sheets, the amounts of silica and the metal phosphate of the tension coating layer and the average thickness of the insulating coating were obtained by the above-described methods.

The results are shown in Table 3.

In addition, as a result of examining a chemical composition of a base steel sheet, Si: 3.28%, C: 0.001%, sol. Al: less than 0.001%, N: 0.001%, Mn: 0.07%, S: less than 0.0005%, and a remainder being Fe and impurities were contained.

TABLE 3

| | Coating liquid | | | | | Conditions for forming tension coating | | Tension coating layer | | | |
|---|---|---|---|---|---|---|---|---|---|---|---|
| | Metal phosphate | | Molar ratio of additional element | Colloidal silica | | Sheet temperature (° C.) | Time (sec) | Silica content (mass %) | Total amount of metal phosphate and silica (mass %) | Average thickness of insulating coating (μm) | |
| No. | Type | parts by mass | | Type | parts by mass | | | | | | Note |
| 101 | Aluminum phosphate | 100 | — | C-type | 65 | 860 | 30 | 40 | 100 | 4.6 | Invention Example |
| 102 | Zinc phosphate | | — | C-type | 65 | 860 | 30 | 40 | 100 | 4.3 | Invention Example |
| 103 | Manganese phosphate | | — | S-type | 45 | 880 | 45 | 31 | 100 | 5.9 | Invention Example |
| 104 | Magnesium phosphate | | — | C-type | 85 | 860 | 25 | 45 | 100 | 4.1 | Invention Example |
| 105 | Cobalt phosphate | | — | S-type | 95 | 820 | 25 | 50 | 100 | 7.3 | Invention Example |
| 106 | Strontium phosphate | | — | S-type | 145 | 780 | 110 | 60 | 100 | 6.4 | Invention Example |
| 107 | Aluminum/zinc phosphate | | 0.67 | C-type | 95 | 840 | 60 | 50 | 100 | 3.6 | Invention Example |
| 108 | Aluminum/copper phosphate | | 0.14 | S-type | 115 | 800 | 80 | 52 | 94 | 6.8 | Invention Example |
| 109 | Aluminum/magnesium phosphate | | 0.67 | C-type | 85 | 840 | 60 | 45 | 100 | 4.6 | Invention Example |
| 110 | Aluminum/lithium phosphate | | 0.14 | S-type | 65 | 860 | 30 | 40 | 100 | 5.7 | Invention Example |
| 111 | Aluminum/barium phosphate | | 0.17 | C-type | 65 | 860 | 30 | 40 | 100 | 3.9 | Invention Example |
| 112 | Aluminum/molybdenum phosphate | | 0.17 | S-type | 65 | 860 | 30 | 40 | 100 | 8.8 | Invention Example |
| 113 | Aluminum/vanadium phosphate | | 0.18 | S-type | 65 | 860 | 30 | 40 | 96 | 8.4 | Invention Example |
| 114 | Aluminum/tungsten phosphate | | 0.17 | C-type | 65 | 860 | 30 | 40 | 100 | 5.4 | Invention Example |
| 115 | Aluminum/zirconium phosphate | | 0.18 | C-type | 65 | 860 | 30 | 40 | 100 | 5.6 | Invention Example |
| 116 | Aluminum/magnesium phosphate | | 0.67 | C-type | 65 | 860 | 30 | 40 | 100 | 4.6 | Comparative Example |
| 117 | Aluminum/magnesium phosphate | | 0.67 | C-type | 65 | 860 | 30 | 40 | 100 | 5.2 | Comparative Example |
| 118 | Aluminum/magnesium phosphate | | 0.67 | C-type | 65 | 860 | 30 | 40 | 100 | 4.2 | Comparative Example |
| 119 | Aluminum/magnesium phosphate | | 0.67 | S-type | 115 | 820 | 25 | 52 | 100 | 7.3 | Comparative Example |
| 120 | Aluminum/magnesium phosphate | | 0.67 | S-type | 115 | 820 | 25 | 52 | 100 | 4.4 | Comparative Example |
| 121 | Aluminum phosphate | | — | S-type | 115 | 820 | 25 | 52 | 93 | 3.2 | Comparative Example |
| 122 | Zinc phosphate | | — | S-type | 115 | 820 | 25 | 52 | 93 | 9.4 | Comparative Example |
| 123 | Aluminum phosphate | | — | C-type | 65 | 820 | 25 | 40 | 100 | 1.6 | Comparative Example |

TABLE 3-continued

| | Coating liquid | | | | | Conditions for forming tension coating | | Tension coating layer | | | |
|---|---|---|---|---|---|---|---|---|---|---|---|
| | Metal phosphate | | Molar ratio of | Colloidal silica | | | | Silica | Total amount of metal phosphate | Average thickness of insulating | |
| No. | Type | parts by mass | additional element | Type | parts by mass | Sheet temperature (° C.) | Time (sec) | content (mass %) | and silica (mass %) | coating (μm) | Note |
| 124 | Zinc phosphate | | — | S-type | 115 | 850 | 30 | 52 | 100 | 11.6 | Comparative Example |
| 125 | Aluminum/copper phosphate | | 0.14 | C-type | 20 | 800 | 30 | 18 | 100 | 4.6 | Comparative Example |
| 126 | Aluminum/copper phosphate | | 0.14 | C-type | 160 | 860 | 30 | 63 | 100 | 4.2 | Comparative Example |

In addition, for these steel sheets, adhesion of the insulating coating, coating tension, corrosion resistance, elution property, and magnetic characteristics were obtained by methods described below. The results of each are shown in Table 4.

[Adhesion]

For the adhesion of the coating, a sample having a width of 30 mm and a length of 300 mm was collected from the steel sheet, and this sample was subjected to stress relief annealing at 800° C. for 2 hours in a nitrogen gas stream, thereafter the sample was wound around a 10 mmφ cylinder and unwound, for a bending adhesion test. Thereafter, the adhesion of the coating was evaluated by the degree of peeling (area ratio) of the coating.

Evaluation criteria were set as follows. In a case of A or B, it was determined that the coating adhesion was excellent.

A: Peeling area ratio of 0% to 0.5%
B: Peeling area ratio of more than 0.5% and 5.0% or less
C: Peeling area ratio of more than 5.0% and 20% or less
D: Peeling area ratio of more than 20% and 50% or less
E: Peeling area ratio of more than 50%

[Coating Tension]

The coating tension was calculated by collecting a sample from the steel sheet and performing a backward calculation from a bent state when the insulating coating on one surface of the sample was peeled off.

In a case where the obtained coating tension was 4.0 MPa or more, it was determined that the coating tension was excellent.

[Corrosion Resistance]

According to a salt spray test of JIS Z 2371:2015, a 5% NaCl aqueous solution was allowed to naturally drop onto the sample in an atmosphere of 35° C. for 7 hours.

Thereafter, a rusted area was evaluated on a 10-point scale.

Evaluation criteria were set as follows, and a score of 5 or higher (5 to 10) was determined to be excellent in corrosion resistance.

10: No rust was generated
9: Very small amount of rust generated (area ratio 0.1% or less)
8: Area ratio of rust generated=more than 0.1% and 0.25% or less
7: Area ratio of rust generated=more than 0.25% and 0.50% or less
6: Area ratio of rust generated=more than 0.50% and 1% or less
5: Area ratio of rust generated=more than 1% and 2.5% or less
4: Area ratio of rust generated=more than 2.5% and 5% or less
3: Area ratio of rust generated=more than 5% and 10% or less
2: Area ratio of rust generated=more than 10% and 25% or less
1: Area ratio of rust generated=more than 25% and 50% or less

[Elution Property]

A sample was collected from the obtained steel sheet, the sample was boiled in boiling pure water for 10 minutes, and the amount of phosphoric acid eluted in the pure water was measured. The elution property (mg/m$^2$) was evaluated by dividing the amount of the eluted phosphoric acid by the area of the insulating coating of the boiled grain-oriented electrical steel sheet.

For the measurement of the amount of phosphoric acid eluted in the pure water, the pure water (solution) in which phosphoric acid was eluted was cooled, and a phosphoric acid concentration of a sample obtained by diluting the cooled solution with pure water was measured by ICP-AES and calculated.

When the elution amount per unit area was less than 140 mg/m$^2$, it was determined that the elution property was excellent.

[Magnetic Characteristics]

Iron loss was evaluated as the magnetic characteristics. Specifically, the obtained steel sheet was irradiated with a laser beam under a condition of a UA (irradiation energy density) of 2.0 mJ/mm$^2$ to perform a magnetic domain refinement treatment, and an iron loss (iron loss W17/50 at 50 Hz and 1.7 T) after the magnetic domain refinement treatment was measured.

When the iron loss was 0.70 W/kg or less, it was determined that the magnetic characteristics were excellent.

TABLE 4

| No. | Coating adhesion | Coating tension (MPa) | Corrosion resistance | Elution property (mg/m$^2$) | Iron loss (W17/50) (W/kg) | Note |
|---|---|---|---|---|---|---|
| 101 | B | 5.7 | 7 | 10 | 0.66 | Invention Example |

TABLE 4-continued

| No. | Coating adhesion | Coating tension (MPa) | Corrosion resistance | Elution property (mg/m$^2$) | Iron loss (W17/50) (W/kg) | Note |
|---|---|---|---|---|---|---|
| 102 | B | 7.4 | 10 | 6 | 0.64 | Invention Example |
| 103 | A | 12.1 | 10 | 21 | 0.61 | Invention Example |
| 104 | B | 11.6 | 8 | 33 | 0.59 | Invention Example |
| 105 | A | 9.7 | 6 | 19 | 0.61 | Invention Example |
| 106 | A | 9.8 | 7 | 24 | 0.61 | Invention Example |
| 107 | B | 7.4 | 10 | 38 | 0.64 | Invention Example |
| 108 | A | 10.3 | 8 | 32 | 0.59 | Invention Example |
| 109 | B | 6.4 | 7 | 37 | 0.63 | Invention Example |
| 110 | A | 9.4 | 7 | 14 | 0.62 | Invention Example |
| 111 | B | 5.4 | 6 | 28 | 0.66 | Invention Example |
| 112 | A | 12.3 | 8 | 84 | 0.57 | Invention Example |
| 113 | A | 11.4 | 7 | 76 | 0.59 | Invention Example |
| 114 | B | 5.2 | 9 | 46 | 0.66 | Invention Example |
| 115 | B | 5.9 | 6 | 54 | 0.66 | Invention Example |
| 116 | C | 4.4 | 6 | 60 | 0.78 | Comparative Example |
| 117 | C | 3.4 | 4 | 36 | 0.81 | Comparative Example |
| 118 | C | 3.6 | 4 | 124 | 0.74 | Comparative Example |
| 119 | C | 7.4 | 7 | 27 | 0.68 | Comparative Example |
| 120 | B | 6.8 | 4 | 35 | 0.71 | Comparative Example |
| 121 | B | 4.6 | 3 | 153 | 0.73 | Comparative Example |
| 122 | B | 11.6 | 7 | 141 | 0.82 | Comparative Example |
| 123 | C | 2.1 | 2 | 38 | 0.79 | Comparative Example |
| 124 | C | 8.8 | 8 | 120 | 0.77 | Comparative Example: |
| 125 | B | 4.6 | 5 | 167 | 0.71 | Comparative Example |
| 126 | B | 5.4 | 6 | 36 | 0.73 | Comparative Example |

As shown in Tables 1 to 4, Nos. 101 to 115, which are examples of the present invention, were excellent in coating adhesion, excellent in coating tension, and excellent in magnetic characteristics. In addition, the corrosion resistance and the elution property were sufficient. Contrary to this, Nos. 116 to 126 were inferior in at least one of the coating adhesion, the coating tension, and the magnetic characteristics. In addition, there were cases where the corrosion resistance and the elution property were also inferior.

BRIEF DESCRIPTION OF THE REFERENCE SYMBOLS

1 Base steel sheet

12 Etch pit structure

2 Insulating coating

21 Intermediate layer

22 Tension coating layer

100 Grain-oriented electrical steel sheet

What is claimed is:

1. A grain-oriented electrical steel sheet comprising:

a base steel sheet; and an insulating coating formed on a surface of the base steel sheet, the insulating coating includes an intermediate layer formed on a base steel sheet side and containing a crystalline metal phosphate, and a tension coating layer formed on a surface side of the insulating coating, the surface of the base steel sheet has an etch pit structure, an average thickness of the intermediate layer is 0.2 to 10.0 μm, an average thickness of the insulating coating is 2.0 to 10.0 μm, the tension coating layer contains a metal phosphate and silica, and an amount of the silica in the tension coating layer is 20 to 60 mass %, wherein a forsterite-based coating is not formed on the surface of the base steel sheet.

2. The grain-oriented electrical steel sheet according to claim 1, wherein the crystalline metal phosphate of the intermediate layer comprises one or more of zinc phosphate, manganese phosphate, iron phosphate, and zinc calcium phosphate.

3. A method for forming the insulating coating included in the grain-oriented electrical steel sheet according to claim 1, the method comprising:

a secondary recrystallisation annealing process of applying an annealing separating agent containing 10 to 100 mass % of $Al_2O_3$ to a steel sheet, drying the steel sheet, and performing secondary recrystallisation annealing on the steel sheet;

an annealing separating agent removing process of removing an excess amount of the annealing separating agent from the steel sheet after the secondary recrystallisation annealing process;

an acid treatment process of immersing the steel sheet after the annealing separating agent removing process in a mixed acid in which a concentration of one or more of sulfuric acid, phosphoric acid, and nitric acid is 0.5 to 20 wt % and a liquid temperature is 40° C. to 90° C. for 5 to 50 seconds;

an immersion process of immersing the steel sheet after the acid treatment process in a treatment liquid containing 5 to 50 mass % of a metal phosphate at a liquid temperature of 40° C. to 85° C. for 5 to 150 seconds;

a drying process of pulling up the steel sheet after the immersion process from the treatment liquid, removing an excess amount of the treatment liquid, and drying the steel sheet; and a tension coating layer forming process of applying a coating liquid containing a metal phosphate and colloidal silica so that an amount of the colloidal silica is 30 to 150 parts by mass with respect to 100 parts by mass of the metal phosphate to the steel sheet after the drying process, drying the steel sheet, and holding the steel sheet in a state in which a sheet temperature is 700° C. to 950° C. for 10 to 120 seconds.

4. The method for forming the insulating coating according to claim 3, wherein the annealing separating agent further contains one or two of MgO: 5 to 90 mass % and a chloride: 0.5 to 10.0 mass %.

* * * * *